(12) United States Patent
Flieswasser et al.

(10) Patent No.: US 7,570,799 B2
(45) Date of Patent: Aug. 4, 2009

(54) MORPHOLOGICAL INSPECTION METHOD BASED ON SKELETONIZATION

(75) Inventors: Roni Flieswasser, Neise (BE); Moti Yanuka, Haifa (IL); Boris Dolgin, Nazareth Illit (IL)

(73) Assignee: Camtek Ltd., Migdal Haemek (IL)

( * ) Notice: Subject to any disclaimer, the term of this patent is extended or adjusted under 35 U.S.C. 154(b) by 348 days.

(21) Appl. No.: 10/508,526

(22) PCT Filed: Mar. 17, 2003

(86) PCT No.: PCT/IL03/00227

§ 371 (c)(1),
(2), (4) Date: Jul. 11, 2005

(87) PCT Pub. No.: WO03/081531

PCT Pub. Date: Oct. 2, 2003

(65) Prior Publication Data

US 2006/0233433 A1    Oct. 19, 2006

(30) Foreign Application Priority Data

Mar. 21, 2002    (IL) .................................... 148828

(51) Int. Cl.
*G06K 9/00*    (2006.01)
(52) U.S. Cl. .................................... 382/149
(58) Field of Classification Search .............. None
See application file for complete search history.

(56) References Cited

U.S. PATENT DOCUMENTS 5,129,009 A    7/1992    Lebeau
5,659,630 A    8/1997    Forslund

FOREIGN PATENT DOCUMENTS

EP    999440 A1 *    5/2000

* cited by examiner

*Primary Examiner*—Vikkram Bali
*Assistant Examiner*—Elisa M Rice
(74) *Attorney, Agent, or Firm*—Pearl Cohen Zedek Latzer, LLP

(57) ABSTRACT

A morphological inspection method based on a comparison of real images—a real reference image and a real inspected image of an inspected object is disclosed.

13 Claims, 3 Drawing Sheets

MORPHOLOGICAL INSPECTION METHOD BASED ON SKELETONIZATION

FIELD OF THE INVENTION

The present invention relates to a morphological tracking method. More specifically, the present invention relates to an inspection method that is useful in automatic inspection.

BACKGROUND OF THE INVENTION

Defects in the form of structural flaws, process residues, and external contamination occur during the production of objects such as Printed Circuit Boards, semiconductor wafers, artwork or reticles. Defects are typically detected by a class of instruments called defect scanners (or automatic optical inspection systems). Such instruments automatically scan the object's surfaces and detect morphological or design anomalies using a variety of techniques. The location of these anomalies with respect to the patterns on the object's surface is recorded. This information, or "defect map," is stored in a computer file and sent to a defect review station.

Using the defect map to locate each defect, a human operator observes each defect under a microscope and characterizes each defect according to type (e.g., particle, pit, scratch, or contaminant). Information gained from this process is used to correct the source of defects, and thereby improve the efficiency and yield of the semiconductor production process. Unfortunately, people are relatively slow and are quickly fatigued by the highly-repetitive task of observing and characterizing defects.

Methods of automatically characterizing defects, collectively known as Automatic Defect Characterization (ADC) or Automatic Optical Inspection (AOI) have been developed to overcome the disadvantages of manual defect characterization.

One of the well-known algorithms that is used by AOI systems is a skeleton comparison algorithm. This algorithm skeletonizes the objects of both images—the reference image and the inspected image—and compares the skeletons' junctions and the skeletons' ends in both of the two skeleton images. Skeletonization must be done in real time and in the inspection station. Moreover, the skeletonization process requires a lot of computing source. Consequently, the main disadvantage of these inspection systems is that they are complicated and expensive.

It would be advantageous to have a method and a system, which once skeletonize objects of a reference image and compare this skeletonized image with a real image of the inspected object. This method reduces significantly the costs of the inspection scanners that intend to supply only a real image without real time sketetonization. Moreover, another computer wherein the processing time is not very critical can do the process.

SUMMARY OF THE INVENTION

The present invention is a morphological inspection method based on a comparison of real images—a real reference image and a real inspected image of an inspected object.

According to the teachings of the present invention there is provided an inspection method based on a comparison of real images, made of the following steps:

creating a reference mask that contains a first color image and a second color image. The first-color image is obtained from skeletonization of the reference real image, having a skeletons image and the second-color image is obtained from skeletonization of an inversion of the reference image, having an edges-skeleton image;

painting the inspected image in a third color and performing logical functions using the first-color image and the third-color inspected image, having a first-defects-image, then performing logical functions using the second-color image and the third-color inspected image, having a second-defects-image; and combining the first-defects-image with the second-defects-image, having a defects-image or defects-map.

By another aspect of the present invention it is provided the inspection method, wherein at least one region-of-interest is defined, according to inspection criteria, in the reference image and in the inversion of the reference image—wherein the objects that are not inside the regions of interest are ignorable—and each of the skeletinizations ignore the ignorable objects.

By yet another aspect of the present invention it is provided the inspection method, wherein skeletons of the first-color image and the second-color image are trimmed in a way that ignorable defects are not appearing in the defects-image or the defects-map when performing the logical functions.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the figures.

DETAILED DESCRIPTION

Figure 1:
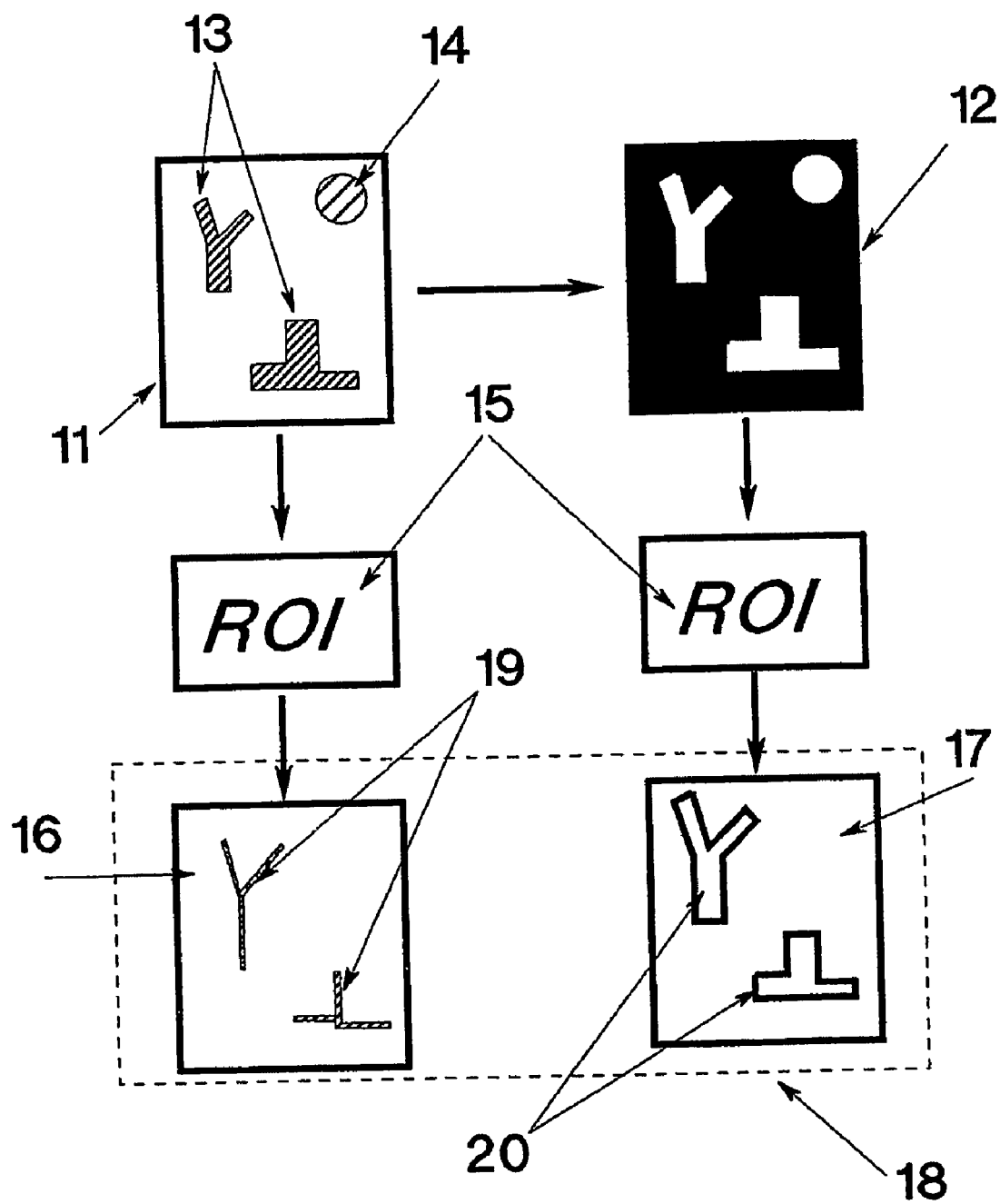
FIG. 1 illustrates a mask preparation, according to the present invention.

The present invention is a morphological inspection method based on a comparison of real images.

According to the method of the present invention, defining regions of interest on a first-color image of the inspection reference object. The non-defined regions are ignorable. Then, skeletonizing the image having a first-color image. In the next step, inversing the inspection reference object image and changing its color. Defining regions of interest and skeletonizing the image, having a second-color image of the objects edges. The first-color image contains skeletons of the interest objects, while the second-color image contains edges of the interest objects.

In the inspection process, comparing a third-color image of the inspected object, with the first-color image. This comparison marks the defects of objects' shape. Then, comparing the third-color image of the inspected object, with the second-color image. This comparison marks the defects of objects' edges. By adding these two images, having a defects image.

The principles and operation of the method according to the present invention may be better understood with reference to the drawing and the accompanying description.

Referring now to the drawing, FIG. 1 illustrates a mask preparation, according to the present invention. A first-color real image 11 is used as a reference for inspection. The first-color image 11 contains objects 13 for inspection and an ignorable object 14. Preferring an inverse image 12, which is the inverse of the first-color image 11, but in a second color. Identifying regions of interest 15 on both images 11 & 12 and performing skeletonization on both images while ignoring ignorable objects that are located out of the defined regions of interest. As a result, having two images, a skeletons image (first color image) 16 contains skeletons 19 of the interested objects and an edge-skeletons image (second color image) 17 contains skeletons 20 that are the edges of the interested objects. The two images, the skeletons image 16 and the edge-skeletons image 17, are used as a reference mask 18.

Figure 2:
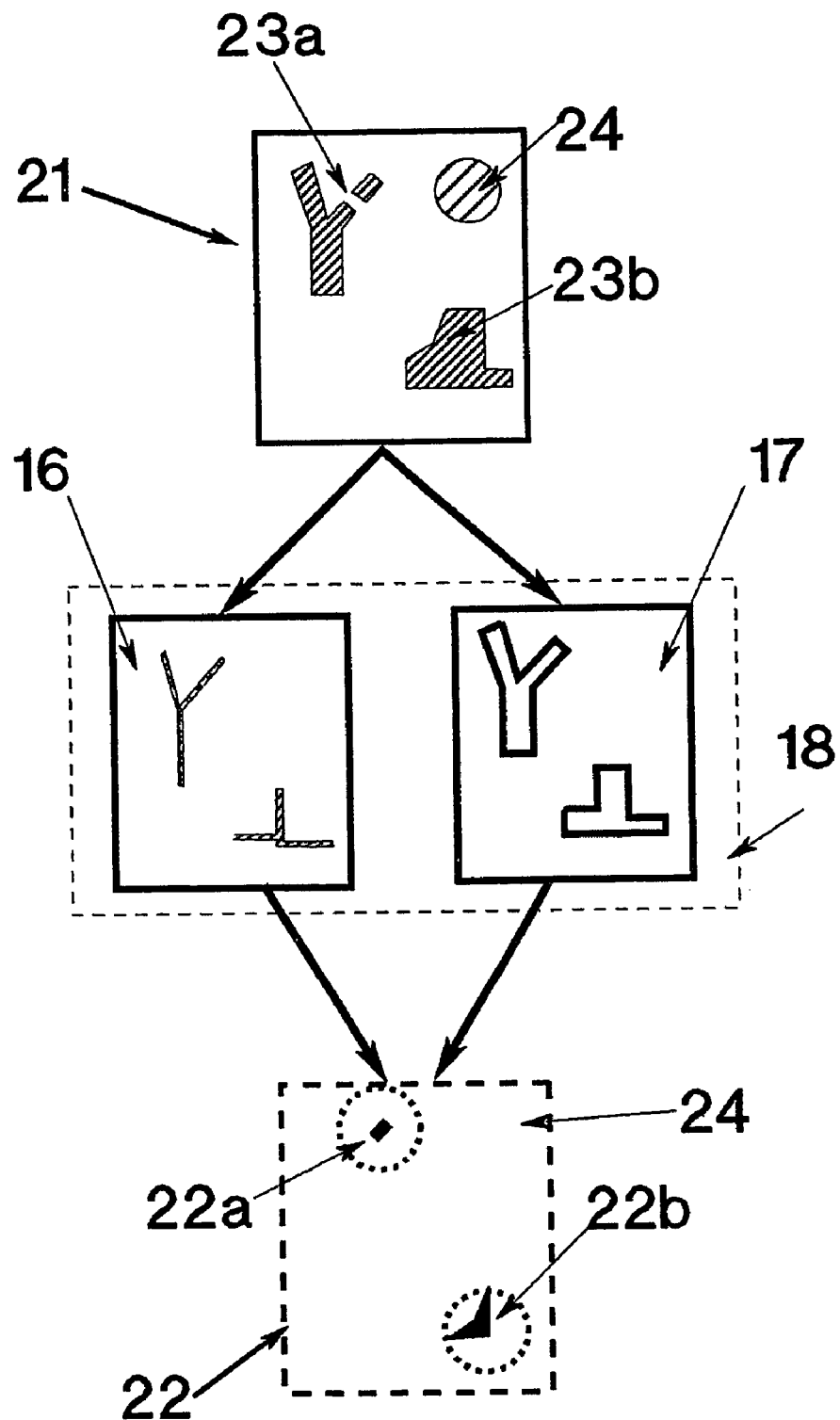
FIG. 2 illustrates the inspection process.

FIG. 2 illustrates the inspection process. The image 21 is the inspected image—obtained from an inspection scanner—contains interested images with a defect 23a (disconnection) in one object and another defect 23b (over-splay) in another object. In addition, the image contains an ignorable object 24. The inspected image 21 is compared with the reference mask 18 first, by performing logical function using the inspected image 21 and the skeletons image 16 of the reference mask 18 and second, by using the inspected image 21 with the edge-skeletons image 17 of the mask 18. As a result, having a defects image 22, which contains the first defect (disconnection) 22a, which is recognized by the skeletons-image 16 and a second defect (over-splay) 22b, which is recognized by the edges-skeleton image 18. Since non-interested objects are not located in the regions of interest, the ignorable object 24 dose not appears in the defects image 22.

Figure 3:
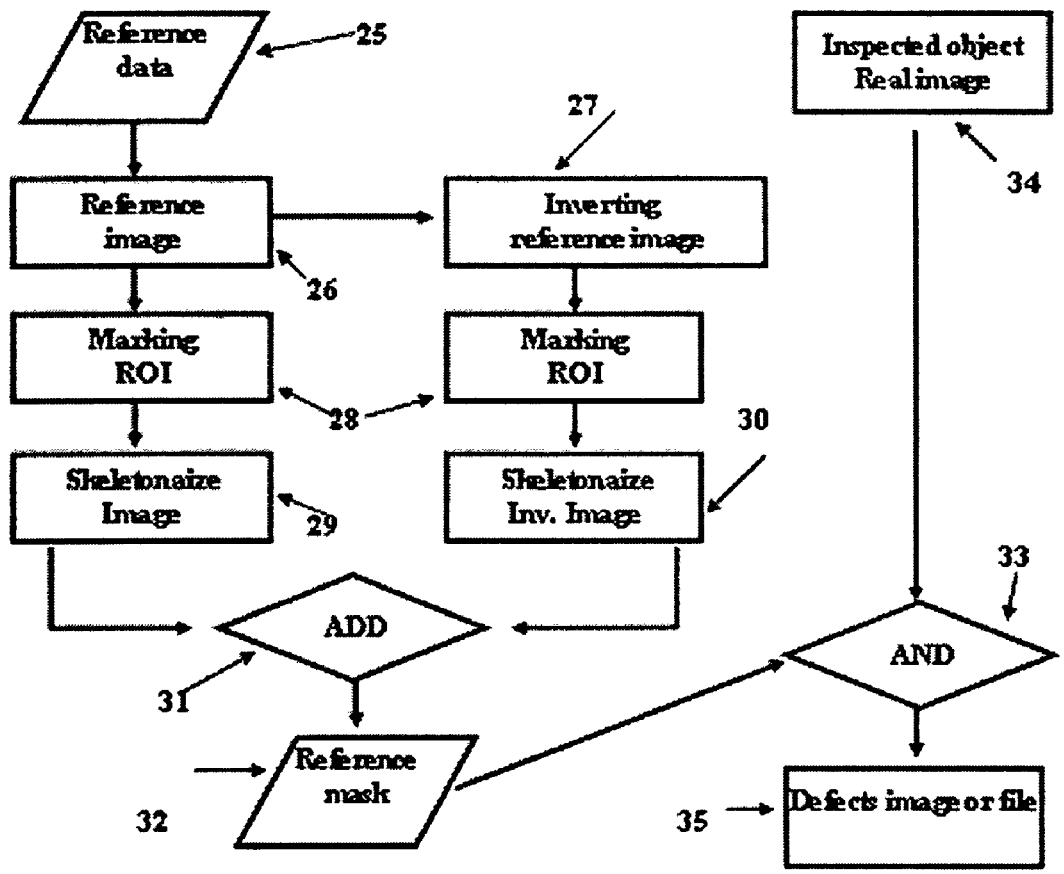
FIG. 3 illustrates a flow chart of the method.

FIG. 3 illustrates a flow chart of the method when inspecting an object. Transferring reference data (such as CAD data file or data achieved from a reference "golden" object) 25 of reference image 26 and inverting the image into an inverse reference image 27, each in different colors. Marking regions of interest 28 in both images. Performing skeletonization of both images thus generating a defects image 35 or defects file.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. A morphological inspection method based on a comparison of real images—a real reference image and a real inspected image of an inspected—object said method comprising:
 a) creating a reference mask, said reference mask is comprised a first-color image and second-color image wherein: i) said first-color image is obtained from skeletonization of said reference real image, thus generating a skeletons image; and ii) said second-color image is obtained from skeletonization of an inversion of said reference image, thus generating an edges-skeletons image, wherein the reference mask, the first-color image and the second color image are created by a signal processor and are stored in a storage coupled to the digital signal processor;
 b) painting said inspected image in a third color and: (i) performing logical functions using said first-color image and said third-color inspected image, thus generating first-defects-image; and (ii) performing logical functions using said second-color image and said third-color inspected image, thus generating second-defects-image, wherein the first-color image and the second-color image are retrieved from said storage and wherein the painting and the performing logical functions are performed by said signal processor; and
 c) combining by said signal processor said first-defects-image with said second-defects-image, thus generating an inspection-defects-image or defects-map.

2. The method of claim 1, wherein at least one region of interest is defined, according to inspection criteria, in said reference image and in said inversion of said reference image—wherein objects that exist outside of said regions of interest are ignorable—and each of said skeletinizations ignores said ignorable objects.

3. The method of claim 1, wherein skeletons of said first-color image and said second-color image are trimmed in a way that ignorable defects do not appear in said defects-image or said defects-map when performing said logical functions.

4. The method of claim 1, wherein the performing of the logical functions using said first-color image and said third-color inspected image is independent of the second-color image.

5. The method of claim 1, wherein the performing of the logical functions using said second-color image and said third-color inspected image is independent of the first-color image.

6. The method of claim 1, wherein the performing of the logical functions using said first-color image and said third-color inspected image substantially consist of applying logical addition to a region of said first-color image and to a region of said third-color inspection image.

7. The method of claim 1, wherein the performing of the logical functions using said second-color image and said third-color inspected image substantially consist of applying logical addition to a region of said second-color image and to a region of said third-color inspection image.

8. A morphological inspection method based on a comparison of a real reference image and a real inspected image of an inspected object, said method comprising:
 (a) creating a reference mask that comprises a first-color image that is a skeletons image and a second-color image that is an edges-skeletons image, wherein the reference mask, the first-color image and the second color image are created by a signal processor and are stored in a storage coupled to the digital signal processor;
 (b) painting by said signal processor said inspected image in a third color;
 (c) applying logical functions to images of a group of images substantially consisting of the first-color image and the third-color inspected image, to provide a first-defects-image, wherein the first-color image is retrieved from said storage and wherein the applying logical functions are performed by said signal processor; and
 (d) applying logical functions to a images of a group of images substantially consisting of the second-color image and the third-color inspected image, to provide a second defects-image, wherein the second-color image is retrieved from said storage and wherein the applying logical functions are performed by said signal processor.

9. The method of claim 8, further comprising combining the first-defects-image and the second-defects-image, to provide an inspection-defects-image.

10. The method of claim 8, wherein the creating comprises (i) skeletonizing the reference image to provide a skeletons image; and (ii) skeletonizing an inversion of said reference image to provide an edges-skeletons image.

11. The method of claim 8, wherein the applying of the logical functions to images of the group of images substantially consisting of the first-color image and the third-color inspected image, substantially comprises applying logical addition to images of the group of images substantially consisting of the first-color image and the third-color inspected image.

12. The method of claim 8, wherein the applying of the logical functions to images of the group of images substantially consisting of the second-color image and the third-color inspected image, substantially comprises applying logical addition to images of the group of images substantially consisting of the second-color image and the third-color inspected image.

13. The method of claim 8, wherein the two stages of applying the logical functions are carried out substantially concurrently.

* * * * *